June 24, 1952  B. G. FULVIO  2,601,605
FISHHOOK TYING FIXTURE
Filed Nov. 17, 1950
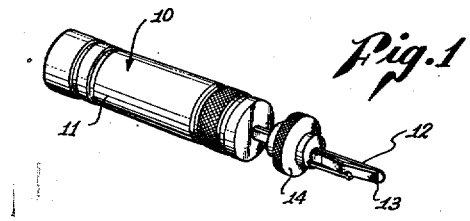
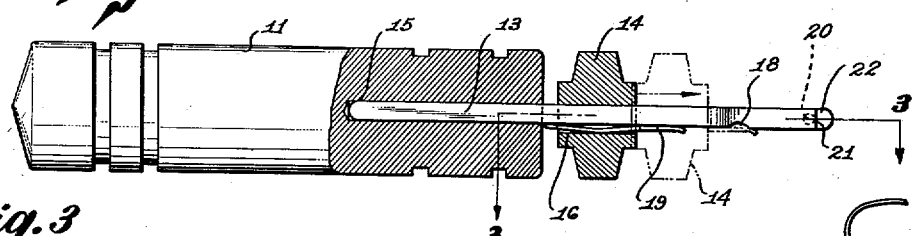
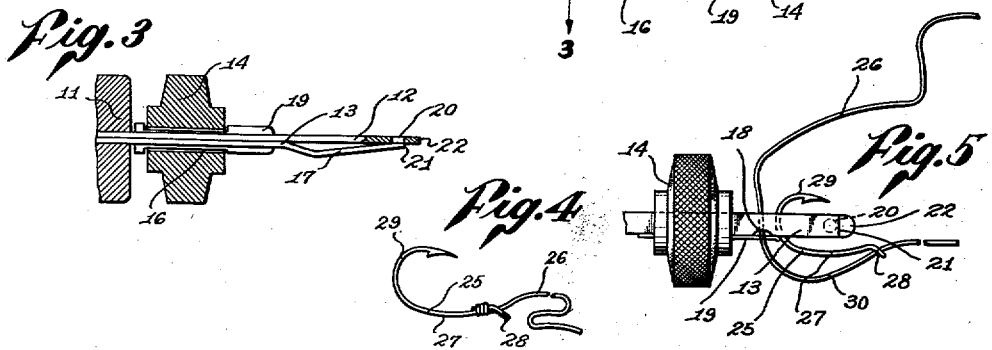
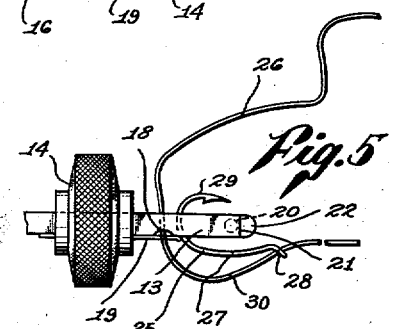
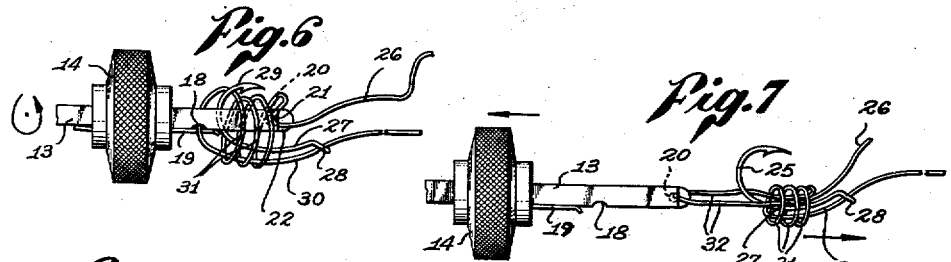
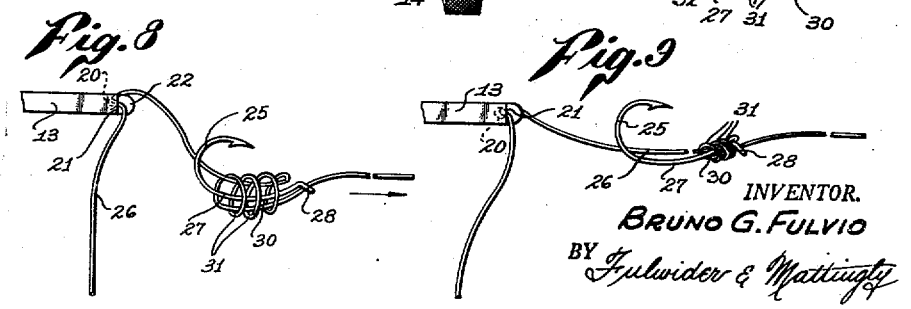
INVENTOR.
BRUNO G. FULVIO
BY Fulwider & Mattingly
Attorneys Patented June 24, 1952

2,601,605

UNITED STATES PATENT OFFICE 2,601,605

FISHHOOK TYING FIXTURE

Bruno G. Fulvio, Arcadia, Calif.

Application November 17, 1950, Serial No. 196,159

11 Claims. (Cl. 43—1)

My invention relates generally to fishing tackle and more particularly to a tool or fixture which facilitates tying a leader onto a small fish hook.

Stream hooks of a size to be baited with salmon eggs or the like, are extremely difficult to attach to a leader because of the limited working space and the necessity for tying a small, firm knot. Furthermore, it is desirable to make the knot as inconspicuous as possible to avoid detection by wary game fish. It is common practice in the art to secure the leader to the hook by a knot which lies below the eye of the hook and is bent around the shank thereof. Thus, when the hook is properly baited, only the leader extends from the bait and is generally undetectable.

Prior practice has been to hand tie the hooks by working the leader into a proper knot around the body of the hook. The task is tedious, time-consuming and requires a skilled touch. In an effort to reduce the amount of skilled labor involved, commercially tied leaders usually employ some type of slip or false knot. Such knots require the free end of the leader to be bound to the standing part in order to avoid slippage. A lacquer or cement is used to bind the leader end, and often this material flakes off under use, and the hook is lost at the crucial moment when the fish strikes.

Accordingly, it is a major object of my invention to provide a hook tying fixture which greatly facilitates attaching a leader to a fish hook in a firm knot.

It is also an object of my invention to provide a fixture which reduces the time necessary to tie the knot and insures a perfect knot.

Another object of my invention is to provide a safe and fool-proof fixture which holds the hook firmly and allows the knot to be tied without injury to the user or damage to the hook.

It is a further object of my invention to provide a portable fixture which may be utilized to tie different types of knots and will be advantageous in tying fishing flies.

Still another object of my invention is to provide a simple and sturdy fixture which may be economically maunfactured and sold at a nominal cost.

These and other objects and advantages of my invention will become apparent from the following detailed description of a preferred form thereof, and from an inspection of the accompanying drawings, in which:

Fig. 1 is a perspective view of a preferred form of my invention;

Fig. 2 is a side elevation partially in section of the fixture;

Fig. 3 is a section taken along the line 3—3 of Fig. 2;

Fig. 4 is a perspective detail of a leader and hook, with a knot set around the hook shank to secure the leader thereon;

Fig. 5 is a partial elevation showing the hook held in the fixture with a leader passed through the hook eye and fixture to position a standing portion of the leader parallel to the hook shank;

Fig. 6 is a partial elevation of the fixture and hook showing the leader coiled around the fixture and hook shank and passed through the gripper eye;

Fig. 7 is a partial elevation showing the fixture with the hook moved forwardly to pull the gripper eye rearwardly through the leader coils;

Fig. 8 is a partial elevation showing the hook and with the leader end pulled free of the knot; and Fig. 9 is a partial elevation showing the knot tightened and slipped up against the hook eye.

In illustrating and describing a preferred embodiment of my invention, I have shown the steps of a tying operation necessary to complete a widely used knot known as a "Monkey knot." It is to be understood, however, that the tying of this knot is by way of illustration only, and that the fixture may be used in tying many different types of knots.

Referring now to the drawings, and particularly to Fig. 1 thereof, a preferred form of fixture is designated by the numeral 10. A cylindrical handle 11 forms the body of the device and carries a pair of forwardly extending grippers or spring blades 12 and 13. The free ends of the blades 12 and 13 provide resilient jaws which are adapted to hold a fish hook therebetween so that the hook lies in a plane parallel to the adjacent faces of the blades. Locking means, such as a collar 14, slidably mounted on the blades 12 and 13 may be moved into position locking the blades against spreading.

As is best seen in Figs. 2 and 3, the blades 12 and 13 are relatively thin spring leaves mounted side by side within a socket 15 formed in the forward end of the handle 11. The locking collar 14 has a rectangular axial slot 16 which fits slidably over the blades 12 and 13 to allow movement of the collar therealong. After a hook is inserted between the end portions of the blades 12 and 13, the locking collar 14 is pushed forwardly to grip the sides of the blades. In order that the locking collar 14 may firmly clamp the blades 12 and 13, the forward portion of the blade 13 is bent away from the plane of the blade 12 and angled inwardly to form a triangular resilient detent 17, as is best seen in Fig. 3. As the collar 14 is moved forwardly, the side walls of the slot 16 flatten the detent 17 inwardly and lock in firm frictional engagement around the blades 12 and 13, holding them against spreading, and at the same time preventing the collar 14 from slipping rearwardly.

To form a guide or holding means for the end portion of the leader, transversely aligned notches 18 are cut into the bottom of the blades 12 and 13 at a position spaced rearwardly from the tips of the blades. A forwardly projecting finger 19 is mounted in the collar 14 and is adapted to slide over the open edges of the notches 18 as is shown in the phantom outline of Fig. 2. After the finger 19 has been moved forwardly, a leader or strand passing through the notch 18 is thus prevented from downward movement. The finger 19 is preferably formed as a spring clip mounted within the slot 16 below the blades 12 and 13 so as to bear resiliently upwardly. Both ends of the finger 19 are flared laterally adjacent the end walls of the collar 14 to lock the finger in proper position within the collar.

Near the tip of the blade 12 is an eye 20 which is spaced forwardly from the notches 18 and is adapted to receive the terminal end of the leader as will later be described. The blade 13 is made slightly shorter than the blade 12 and has a tip or terminal end portion 21 which just covers the eye 20 and bears resiliently inwardly against a rounded tip 22 formed on the blade 12. Thus, a leader passed through the eye 20 may be held against sliding movement by the frictional engagement between the tips 21 and 22.

In order to completely understand the function of my invention, it is best described in conjunction with tying or knotting of a leader onto a fish hook. An illustration of a desirable knot for attaching a hook 25 to a conventional line or leader 26 is seen in Fig. 4. The hook 25 has a shank or stem 27 formed with a closed eye 28 at one end thereof. The other end of the shank 27 is angled outwardly and recurved to form a barbed fluke 29 which engages the fish in a conventional manner. The leader 26 is tied around the shank 27 in the aforementioned "Monkey knot" and extends upwardly through the eye 28 to be secured to the desired fishing tackle. As can be seen, the knot is tied completely upon the shank 27, and that portion of the leader which extends beyond the eye 28 is a single strand, and is therefore generally undetectable by the fish.

In Fig. 5 the hook 25 is shown held in position between the gripper blades 12 and 13 to commence the tying operation. The shank 27 is held parallel to and slightly below the blades 12 and 13 with the hook eye 28 projecting forwardly, and the barbed fluke 29 spaced rearwardly from the blade tips 21 and 22 and a short distance forwardly from the notches 18. The free end of the leader 26 is passed rearwardly through the hook eye 28 and then through the notch 18 to provide a working end which extends upwardly. A short section of the leader 26 indicated at 30 thus extends between the notch 18 and the hook eye 28 to form a standing portion which is generally parallel to the shank 27. The locking collar 14 is moved forwardly to compress the blades 12 and 13 firmly on the hook 25, and the finger 19 covers the notch 18 and holds the leader 26 firmly therein.

The next step in the operation is to bend the leader 26 into coils or bights 31 around the shank of the hook 27 as is shown in Fig. 6. This may be done by rotating the handle 11 counterclockwise, and holding the end of the leader 26 forwardly so that the bights are clear of the barbed fluke 29 and pass over the tops of the blades 12 and 13. The bottom of the bights 31 encircle the standing section 30 as well as the shank 27 to form closed loops which are coiled forwardly in a generally helical shape. After three or more bights 31 have been taken, the end of the leader 26 is pushed inwardly through the outside of the blade eye 20 and is passed forwardly. This is easily done, since the hook 25 has previously wedged the blades 12 and 13 open so that there is a slight space between the blade ends 21 and 22 through which the leader 26 may be passed.

To complete the knot, it is necessary to pull the free end of the leader 26 through the bights 31. The locking collar 14 is moved rearwardly as is seen in Fig. 7 to allow spreading of the blades 12 and 13 so that the hook 25 may be pulled forwardly. The finger 19 uncovers the edges of the notches 18 so as to free the rearward bight 31 for forward movement. As the hook 25 is moved out from between the blades 12 and 13, the portion of the leader 26 passing through the eye 20 is clamped frictionally between the blade tips 21 and 22 which spring together. As the hook 25 continues to move forwardly, the blades 12 and 13 are pulled through the bights 31 to pass the leader 26 rearwardly in an internal loop 32. As the loop 32 is extended, the bights 31 are partially tightened and adjusted with the fingers to coil neatly around the shank 27.

The free end of the leader 26 is then pulled rearwardly out of the bights 31, as is seen in Fig. 8. After this is done, the standing portion 30 is pulled forwardly through the hook eye 28 so as to slip the knot up firmly against the hook eye and tighten the bights 31. The free end of the leader 26 is then clipped off adjacent the rearward bight 31 and the leader and hook 25 are firmly secured. As tension is placed on the leader, the bights 31 tighten around the standing portion 30 and prevent the knot from slipping through the eye 28. The completed knot firmly secures the leader to the hook, and is uniformly tied by the use of my fixture. It can be appreciated that the steps in tying the knot are greatly simplified by the use of my fixture, and that this is particularly true when working with very fine leaders and small hooks.

Although I have described the operation of my invention in conjunction with the tying of a particular knot, I wish it to be understood that the fixture may be utilized in many similar operations, and is not to be limited by the aforementioned description. Likewise, many changes of design and construction will be apparent to those skilled in the art, and I do not wish to be limited to the structure detailed herein, except as defined in the appended claims.

I claim:

1. A hook tying fixture comprising: handle means; and a gripper means extending forwardly from said handle means and adapted to hold a hook therein; said gripper means having guide notches spaced rearwardly from the free end thereof adapted to guide an end portion of a leader, whereby a standing part of said leader may be held in position while said leader is bent around said shank and said gripper means in coiled bights, said gripper means also having means spaced forwardly of said notches to receive the end of said leader for passing said end through said bights upon forward removal of said hook from said fixture.

2. A hook tying fixture comprising: handle means; gripper means extending forwardly from said handle means and adapted to hold a hook therein, said gripper means having guide notches spaced rearwardly from the free end thereof adapted to hold an end portion of a leader; and means associated with said gripper means to close the open side of said notches, whereby a standing portion of said leader may be held in selected alignment while said leader is bent around said shank and said gripper means in coiled bights, said gripper means also having means spaced forwardly of said notches to receive the end of said leader for passing said end through said bights upon forward removal of said hook from said fixture.

3. A hook tying fixture comprising: handle means; gripper means extending forwardly from said handle means and adapted to engage a hook placed therein; and locking means mounted on said gripper means for locking said gripper means in clamping engagement with said hook, said gripper means having guide notches spaced rearwardly from the free end thereof adapted to hold an end portion of a leader, whereby a standing portion of said leader may be held in position while said leader is bent around said shank and said gripper means in coiled bights, said gripper means also having eye means spaced forwardly of said notches to receive the end of said leader for passing said leader through said bights upon forward removal of said hook from said fixture.

4. A hook tying fixture comprising: handle means; gripper means extending forwardly from said handle means and including jaws for holding a hook placed therebetween with the shank of said hook extending generally parallel to said jaws; locking means mounted on said gripper means for locking said jaws against spreading, said gripper means having aligned guide notches spaced rearwardly from the free ends of said jaws and adapted to hold an end portion of a leader; and means associated with said gripper means to close the open side of said notches whereby a standing portion of said leader may be held generally parallel to said shank while said leader is bent around said standing portion, shank and gripper jaws in coiled bights, said gripper jaws having eye means spaced forwardly of said notches to receive the end of said leader for passing said end through said bights upon forward removal of said hook from said fixture.

5. A hook tying fixture comprising: handle means; a pair of elongated gripper blades extending forwardly from said handle means, said blades being separable to hold a hook therebetween with the shank of said hook extending generally parallel to said blades; locking means slidably mounted on said blades for locking said blades against spreading, said blades having aligned guide notches spaced rearwardly from the free ends of said blades and adapted to hold an end portion of a leader; and slidable means associated with said blades and movable to a position closing the open side of said notches whereby a standing portion of said leader may be held generally parallel to said shank while said leader is bent around said standing portion, shank and gripper blades in coiled bights.

6. A hook tying fixture comprising: handle means; and a pair of elongated substantially parallel gripper blades extending outwardly from said handle means, said blades being resiliently separable to hold a hook therebetween with the shank of said hook extending generally parallel to said blades whereby an end portion of a leader may be bent around said shank and said gripper blades in coiled bights, one of said gripper blades having an eye in the outer end portion thereof to receive the end of said leader for passing said end through said bights upon forward removal of said hook from said fixture, and the other of said gripper blades having an outer end portion covering said eye and resiliently urged toward said one of said blades for clamping said leader between said blades upon the removal of said hook thereby to prevent said leader from moving through said eye.

7. A hook tying fixture comprising: a handle member; a pair of elongated gripper blades extending forwardly from said handle member, said blades being separable to hold a hook therebetween with the shank of said hook extending generally parallel to said blades; a locking collar slidably mounted on said blades and movable to a forward position locking said blades against spreading, said gripper blades having aligned guide notches spaced rearwardly from the free end of said blades and adapted to hold an end portion of a leader; and a member projecting from said locking collar and adapted to close the open side of said notches upon forward positioning of said collar, whereby a standing portion of said leader may be held generally parallel to said shank while said leader is bent around said standing portion, shank and blades in coiled bights, and one of said gripper blades having an eye spaced forwardly of said notches to receive the end of said leader for passing said end through said bights upon forward removal of said hook from said fixture.

8. A hook tying fixture comprising: a handle member; a pair of elongated gripper blades extending forwardly from said handle member, said blades being separable to hold a hook therebetween with the shank of said hook extending generally parallel to said blades; a locking collar slidably mounted on said blades and movable to a forward position locking said blades against spreading, said gripper blades having aligned guide notches spaced rearwardly from the free end of said blades and adapted to hold an end portion of a leader; a member projecting from said locking collar and adapted to close the open side of said notches upon forward positioning of said collar, whereby a standing portion of said leader may be held generally parallel to said shank while said leader is bent around said standing portion, shank and blades in coiled bights, one of said gripper blades having an eye spaced forwardly of said notches to receive the end of said leader for passing said end through said bights upon forward removal of said hook from said fixture, and the other of said gripper blades having a terminal end covering said eye and urged resiliently inward to clamp said leader nonslidably upon the removal of said hook.

9. A hook tying fixture comprising: a cylindrical handle; a pair of resilient elongated blades fixed in said handle and extending forwardly in side-by-side relationship, said blades being separable to grasp a hook therebetween with the shank of said hook extending generally parallel to said blades, one of said blades having a detent portion spaced away from the plane of the other blade; a locking collar slidably mounted on said blades and movable to a forward position over said blade detent whereby to compress said blades firmly on said hook; said gripper blades having aligned guide notches in the bottom thereof spaced rearwardly from the free ends of said blades, and adapted to hold an end portion of a leader; and a spring clip secured in said locking collar below said blades and having a forwardly extending finger bearing against the bottom edges of said blades and adapted to close the open sides of said notches upon forward positioning of said collar, whereby a standing portion of said leader may be held generally parallel to said shank while said leader is bent around said standing portion, shank and blades in coiled bights, one of said gripper blades having an eye spaced forwardly of said notches to receive the end of said leader for passing said end through said bights upon forward removal of said hook from said fixture, and the other of said gripper blades having a terminal end covering said eye and urged resiliently inward to clamp said leader nonslidably upon the removal of said hook.

10. A hook tying fixture comprising: a handle; and a pair of elongated substantially parallel gripper blades formed as relatively thin spring leaves having one end portion held non-rotatably within said handle and the remaining portion extending forwardly therefrom, said blades being resiliently separable to hold a hook therebetween with the shank of said hook extending generally parallel to the longitudinal axis of said blades and with the fluke end of said hook projecting outwardly from between said blades whereby an end portion of a leader may be bent around said gripper blades and said shank in coiled bights, one of said blades having an eye in the terminal end thereof to receive the end of said leader for passing said end through said bights upon forward removal of said hook from said fixture, and the other of said blades having a terminal end covering said eye and urged resiliently inward to clamp said leader non-slidably upon the removal of said hook whereby said bights are tightened about said shank, the standing portion of said leader, and the leader end passing therethrough to form a knot tightening upon itself under tension on said leader.

11. A hook tying fixture comprising: a pair of elongated substantially parallel gripper blades formed as relatively thin spring leaves having one end portion held together and the remaining portion extending forwardly therefrom, said blades being resiliently separable to hold a hook therebetween with the shank of said hook extending generally parallel to the longitudinal axis of said blades and with the fluke end of said hook projecting outwardly from between said blades whereby an end portion of a leader may be bent around said gripper blades and said shank in coiled bights, one of said blades having an eye in the terminal end thereof to receive the end of said leader for passing said end through said bights upon forward removal of said hook from said fixture, and the other of said blades having a terminal end covering said eye and urged resiliently inward to clamp said leader non-slidably upon the removal of said hook; and a member slidably mounted on said blades and movable forwardly to the terminal ends thereof.

BRUNO G. FULVIO.

REFERENCES CITED

The following references are of record in the file of this patent:

UNITED STATES PATENTS

| Number | Name | Date |
| --- | --- | --- |
| 347,858 | Zimmerman | Aug. 24, 1886 |
| 2,107,645 | Parkhurst | Feb. 8, 1938 |